United States Patent [19]
Few et al.

[11] Patent Number: 5,348,330
[45] Date of Patent: Sep. 20, 1994

[54] INTEGRATED STABILIZER JACK APPARATUS

[75] Inventors: Jeffrey P. Few, West Hills, Calif.; Thomas Rumler, Bristol, Ind.

[73] Assignee: Norco Industries, Inc., Compton, Calif.

[21] Appl. No.: 111,410

[22] Filed: Aug. 25, 1993

[51] Int. Cl.⁵ .................................. B60S 9/02
[52] U.S. Cl. .................... 280/475; 254/424; 280/763.1
[58] Field of Search .......... 280/475, 762, 763.1, 280/764.1, 765.1, 766.1; 254/418, 424, 425

[56] References Cited

U.S. PATENT DOCUMENTS

| | | | |
|---|---|---|---|
| 1,549,810 | 8/1925 | Sauer | 254/425 |
| 1,930,802 | 10/1933 | Hamilton | 254/133 R |
| 2,358,488 | 9/1944 | Black | 254/419 |
| 3,096,065 | 7/1963 | Horne | 248/354.3 |
| 3,236,501 | 2/1966 | McKay | 254/419 |
| 3,475,008 | 10/1969 | Taylor | 254/424 |
| 3,489,428 | 1/1970 | Hunter et al. | 280/765.1 |
| 3,565,396 | 2/1971 | Spear | 254/424 |
| 3,642,242 | 2/1972 | Danekas | 280/763.1 X |
| 3,656,778 | 4/1972 | Bristol | 280/763.1 |
| 3,658,359 | 4/1972 | Claflin | 254/419 |
| 3,722,948 | 3/1973 | Walsh | 296/35.3 |
| 3,826,470 | 7/1974 | Spear | 254/424 |
| 3,854,750 | 12/1974 | Voehringer | 280/764.1 |
| 3,870,276 | 3/1975 | Phillips | 254/425 |
| 3,989,277 | 11/1976 | Stahl | 280/764.1 |
| 4,103,869 | 8/1978 | Mesny | 254/425 |
| 4,148,162 | 4/1979 | Goodrich | 52/23 |
| 5,042,779 | 8/1991 | Eden | 254/424 |
| 5,137,297 | 8/1992 | Walker | 280/763.1 X |
| 5,205,586 | 4/1993 | Tallman | 280/764.1 |

FOREIGN PATENT DOCUMENTS

| | | | |
|---|---|---|---|
| 0579665 | 10/1924 | France | 254/424 |
| 0031115 | 11/1926 | France | 254/425 |
| 1025017 | 4/1953 | France | 254/425 |

Primary Examiner—Brian L. Johnson
Assistant Examiner—Victor E. Johnson
Attorney, Agent, or Firm—Fulwider, Patton, Lee & Utecht

[57] ABSTRACT

A recreational vehicle with a floor support design that integrates two pair of jack assemblies into the undercarriage frame. The jack mounting housing is a load bearing frame member to which the jack assemblies are mounted. The jacks in one embodiment are placed in a diagonal direction to the longitudinal centerline of the vehicle at the four corners of the carriage floor. The jack assembly incorporates a channel shaped leg and linkage arrangement which internest upon retraction in covering relation under a jack screw.

5 Claims, 2 Drawing Sheets

INTEGRATED STABILIZER JACK APPARATUS

BACKGROUND OF THE INVENTION

1. Field of the Invention

The present invention relates, generally, to stabilizing devices for recreational vehicles and more particularly to a better undercarriage frame into which a stabilizer jack is integrated.

2. Description of the Prior Art

Recreational vehicles have spring suspension systems to make the ride smooth for both fixtures and passengers. While the suspension system improves comfort of passengers and minimizes vibrating of fixtures within the vehicle, it allows instability and unwanted rocking motions when passengers move about therein while the vehicle is parked. Suspension systems and supporting wheels allow for the vehicle to rock both fore and aft and laterally on the springs as well as fore and aft with the wheels as such wheels roll slightly fore and aft in response to shifting weight.

The recreational vehicle industry has developed several stabilizer jacks in an attempt to solve the problem of recreational vehicle and trailer rocking. By way of example, several devices can be found in U.S. Pat. Nos. 3,096,065; 3,475,008; 3,656,778; 3,826,470; 3,854,750; 3,870,276; 4,103,869; 5,042,779; and 5,205,586. Conceptually, the most desirable devices provide maximum stability with a minimum number of parts. Such a design reduces costs and helps maximize weight efficiency ratios.

U.S. Pat. No. 5,205,586 to Tallman, assigned to the assignee of the present application shows a recreational vehicle stabilizer, including jack assemblies mounted at the laterally opposite extremities of telescopical jack housing channels so that the housing can be easily adjusted to different width trailers. Such devices, while enjoying a degree of commercial success, suffer the shortcoming that they require a separate housing of sufficient rigidity and strength to carry the jack assemblies and to transmit the jack forces to the vehicle frame without undue rocking or play. Even then, it is recognized that the stabilizing forces being directed through the jack housings to the vehicle frames allow for some degree of flex and play in the connections of such housings and consequent racking of the housings as weight is applied thereto from the interior of the trailer. Additionally, shifting of weight fore and aft within the recreational vehicle which tends to rock the supporting wheels fore and aft only resisted to a minor extent. Thus, to properly stabilize the vehicle it is necessary to provide auxiliary stabilization against backward and forward rocking of the support wheels, as by application of a wheel block or choke.

The strength of the jack assembly could be enhanced if the load of the jack assembly were born directly by the frame. This would ensure that the weight of the vehicle was supported by the strongest part of the vehicle. Furthermore, mounting of the stabilizer jacks to the outer perimeter of the RV floor, would provide the broadest and hence most stable support for the R.V. or trailer.

Since the frame members are typically disposed well underneath and away from the perimeter of the vehicle, jack assemblies of the prior art could not be placed both under the frame member and at the outer extremities of the vehicles without sacrificing strength, stability, durability and/or efficiency of weight and cost.

The rocking and vibrational motion of the vehicle in all directions is another problem associated with stabilizing recreational vehicles. Many prior art stabilizers are affixed under the vehicle oriented to extend in a direction perpendicular to the longitudinal frame members. The jack legs are thus usually lowered in rectilinear fashion in a traverse plane so that any bracing effect which might resist horizontal movement of the vehicle applies only to the transverse and not the longitudinal direction. Consequently, such devices are generally ineffective to effectively resist horizontal forward or rearward travelation of the body of the vehicle thus necessitating the use of additional accessories, such as wheel chokes to prevent rolling of the wheels.

Prior art jack stabilizer assemblies are generally constructed to be affixed to the frame after the vehicle is assembled. The points of affixation are often structurally weaker than the frame itself. Loads applied as a result of variable and unstabilizing loads over time subjects the jack systems to a weakening, loosening, breaking or buckling at said point of affixation.

SUMMARY OF THE INVENTION

The invention under consideration provides a new and improved floor structure including a frame design that integrates four jack mounts, called mounting housings, directly into the frame. The jacks can be oriented into optimal position and orchestrated as an integrated system to counter and stabilize against unwanted rocking and motion in all directions. The four jack integrated frame structure provides improved strength, stability, durability, and efficiency of weight and cost.

The invention improves both stability and strength since the floor support design allows the jacks to be placed outward at the perimeter of the vehicle to position the load points of the jacks directly under the structural frame members for optimum support and resistance to movement.

The invention provides for greater efficiency of installation by incorporating jacks as original equipment during initial assembly of the recreational vehicle to leave the individual jacks more accessible after the vehicle has been assembled. The invention accomplishes greater stability while enhancing weight efficiency of the vehicle due to fewer parts and enhanced design integrity.

By eliminating redundant parts and integrating a protective jack housing directly into the frame, the jack systems are protected in their retracted positions and enjoy a long design life.

The support feature of the floor structure is a framework that includes two pairs of forward and rearward mounting housings (jack mounts) that extend diagonally outward with respect to the vehicle's longitudinal centerline-extending to the extreme corners of the floor structure perimeter. The mounting housings are fully integrated into the frame system and are disposed in supporting position under the floor. This feature causes the frame structure to provide a broader support base with the weight borne directly by the frame of the vehicle—thus increasing strength and stability at the same time. The jack assembly includes a jack screw mounted along the housing by inboard and outboard mounting brackets. A telescopically adjustable support leg is attached to the jack screw and is raised and lowered by rotating the screw.

Other features and advantages of the invention will become apparent from the following detailed description taken in conjunction with the accompanying drawings which illustrate, by way of example, the features of the invention.

DESCRIPTION OF THE PREFERRED EMBODIMENT

Figure 1:
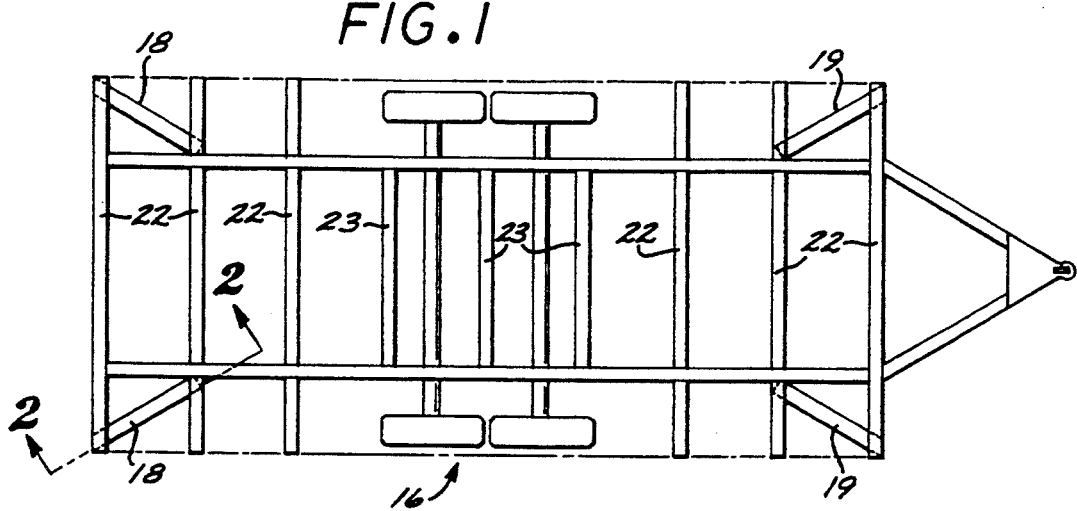
FIG. 1 is a top plan view of an integrated stabilizer jack apparatus embodying the present invention.
Figure 2:
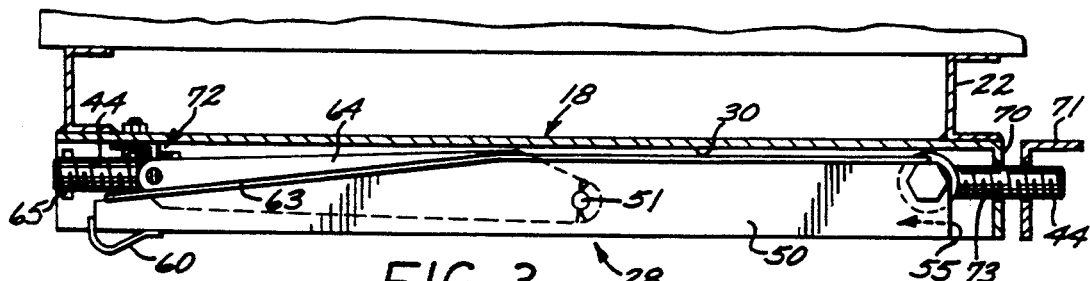
FIGS. 2 and 3 are sectional views taken along the lines of 2—2 of FIG. 1, and showing the stabilizer jack apparatus in retracted and extended positions, respectively.

As shown in the drawings for the purpose of illustration, the invention is embodied in the frame generally designated 16, of a recreational vehicle in the form of a trailer. As illustrated by FIG. 1 and FIG. 2, the floor support structure has an undercarriage frame 16 that fully integrates as floor support members two pair of diagonally extending front and rear jack mounting housings generally designated 18 and 19 disposed at the respective four corners of the trailer. The jack mounting housings have dual function. The mounting housings directly support the carriage floor 24 and position respective jack assemblies, generally designated 28.

Recreational vehicles incorporate suspension systems to provide a smooth ride during travel. When in a parked position, the suspension system allows the vehicle to rock back and forth relative to the support wheels and also frequently results in the support wheels rolling slightly to thus comport the sense of movement as weight is shifted inside the vehicle.

The particular embodiment selected for disclosure includes the undercarriage frame 16 formed with a pair longitudinally extended frame members defined by channel beams. The longitudinally extended channel beams are braced together by spaced apart laterally extended channel beams 22 and 23. A pair of laterally extended frame members 22 run along the respective front and rear ends of the undercarriage frame 16 and extend the full width of the carriage floor.

At each corner of the undercarriage frame 16 a jack mounting housing 18 is integrated with the undercarriage frame in the same manner that the other frame members are integrated therewith. For the purpose of this invention, it will be understood that such housings are integrated in the undercarriage frame 16 at the time of original manufacture by filled welds. The term integrated as used in this description is intended to include equivalent forms of integration, such as bolting and rivetting, it will only be important that the jack housing be rigidly affixed in direct contract to the frame itself. Each mounting housing extends diagonally outward from the intersection of respective longitudinal frame members with respective intermediates laterally extended frame members 22 to the respective outside corners of the frame 16.

Figure 5:
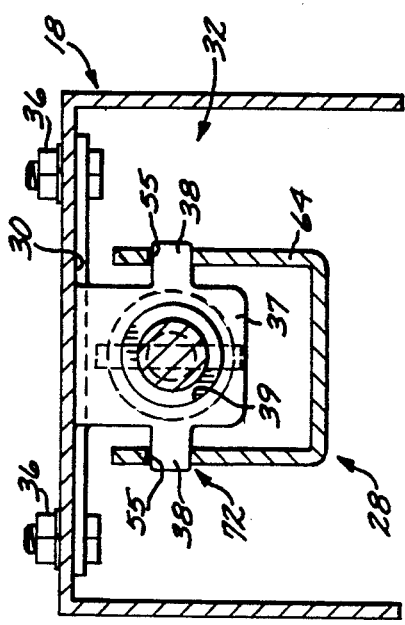
FIG. 5 is a vertical sectional view, in enlarged scale, taken along the line of 5—5 of FIG. 3.

The mounting housing 18 of this particular embodiment (see also FIG. 3 and FIG. 5) is channel shaped to provide a top wall defining a downwardly facing, flat load bearing surface 30 and two downwardly extending side walls designated generally 35 to form therebetween a screw receiving compartment 32 which is open at its outboard end. A jack screw 44 formed with $\frac{5}{8}''$ light pitch, right hand double lead threads is received in the inner cavity 32 and is supported at its outboard end by an outboard mounting angle bracket, generally designated at 72 received in the open outboard end of the compartment 32, and its inboard end by an inboard anchor bracket 70 disposed at the inboard end of the mounting housing 18. The inboard anchor bracket may be an end plate 70 incorporated into the body of the mounting housing, and is formed with a through bore 73 for free passage of the inner extremity of the jack screw 44 (FIG. 5). An auxiliary angle bracket 71 may also be included used to secure the jack screw to the undercarriage frame 16.

The outboard mounting bracket 72 is defined by an angle having an elongated horizontal mounting flange 36 bolted to the mounting housing and a downwardly bent vertical flange 37 of generally cruciform shape to define oppositely disposed axle tabs 38. A central bore 39 is formed in the vertical flange for receipt of the outboard extremity of said screw 44. The vertical flange is pressed between a soft washer 42 and two cap washers 34. A pair of roll pins 43 are pressed through transverse bores in the jack screw to retain the washer assembly therebetween.

A cylindrical trunion 46 carries the inner end of the support leg 50 (FIGS. 3 and 4) is formed with a diametrical through threaded bore 48 which is threaded for screwing therethrough of the jack screw 44 to draw the trunion back and forth thereon. Such axial trunion is formed at its opposite ends with open ended threaded bores 58 for receipt of respective studs 57 which extend through respective bores formed in the respective inner end side walls of the support leg 50.

Figure 3:
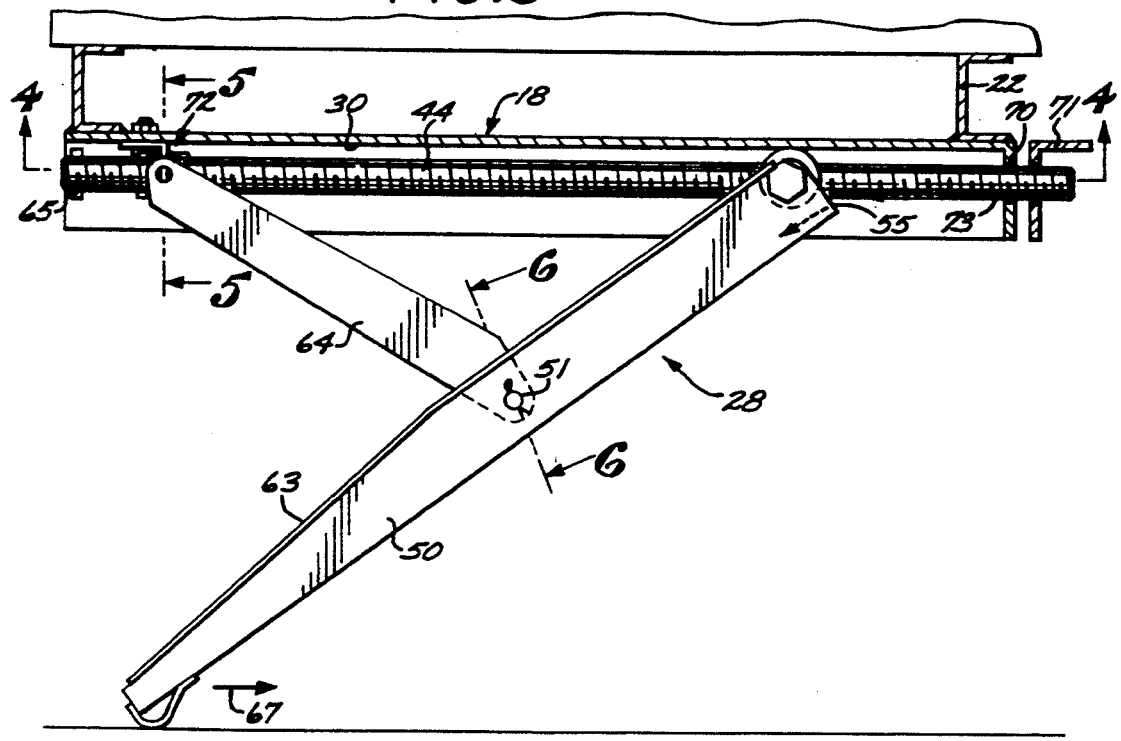
Figure 4:
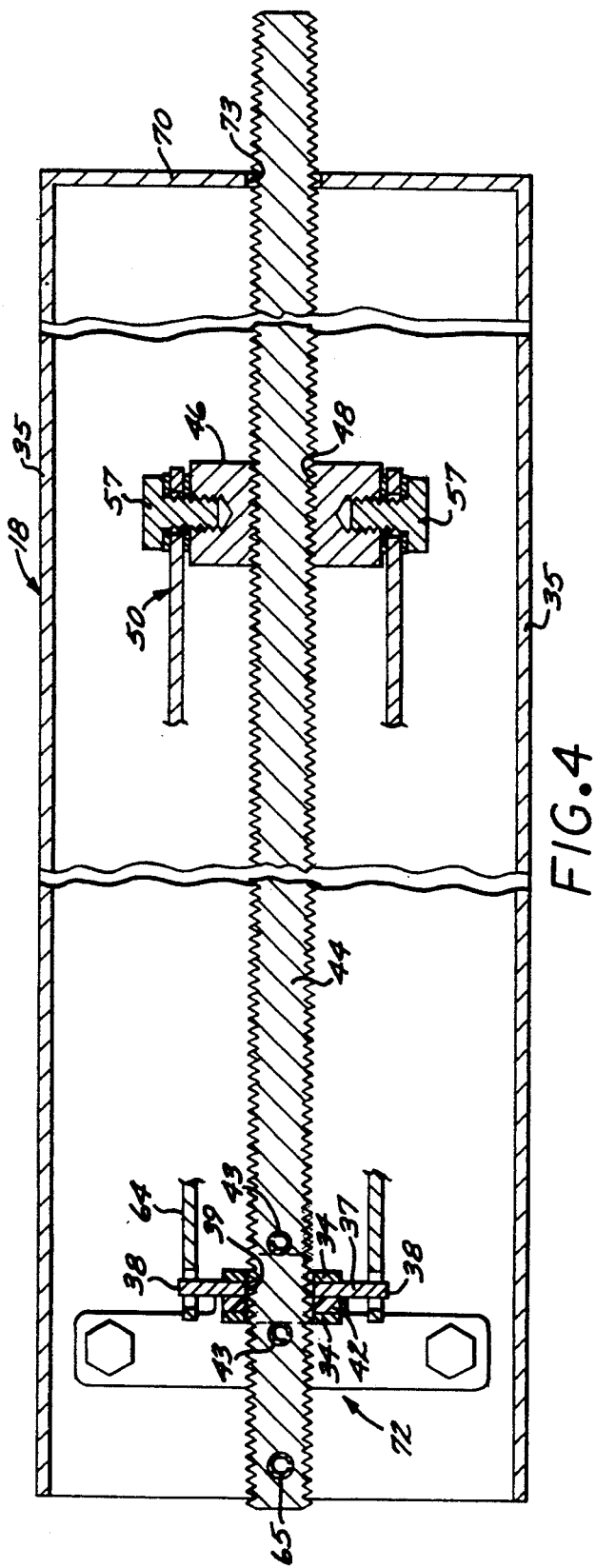
FIG. 4 is a longitudinal sectional view, in enlarged scale, taken along the line of 4—4 of FIG. 3.
Figure 6:
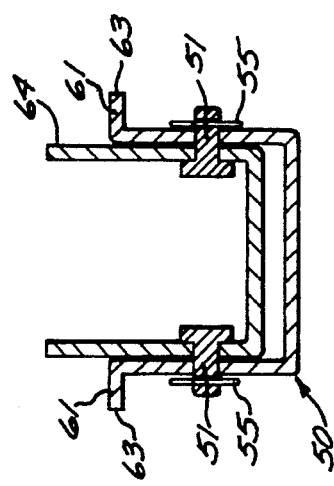
FIG. 6 is a transverse sectional view, in enlarged scale, taken along the line 6—6 of FIG. 3.

Referring to FIGS. 3 and 6, support leg 50 is in the form of an upwardly opening square channel configured with marginal lateral, oppositely out-turned flanges 61 which terminate in lateral outer edges to closely fit the interior of the housing compartment 32. The dimensions of the support leg 50 are such that, when in its retracted position shown in FIG. 2, it covers the bottom side of the major length of the jack screw 44 and cooperates with the lateral dimensions of the compartment to block debris and road dirt from direct impingement on said jack screw.

With continued reference to FIGS. 3 and 6, a channel shaped jack link 64 is connected between the outboard mounting bracket 72 and a point medial along the jack support leg 50. Such link is configured to, upon retraction of the jack, be nested within the retracted lower extremity of the jack support leg. It includes a cavity between its side walls for receipt of the outboard length of the screw when the jack is retracted. The outboard extremity of the link is formed in its opposed side walls with respective oversized through bores 55 (FIG. 5) into which the axle tabs 38 of the mounting bracket 42 are buttoned during assembly to provide a pivotal connection. Referring once again to FIGS. 3 and 6, the lower extremity of the link 64 is formed with bores in its opposite side walls for receipt therethrough of respective pivot pins 51 projecting through bores disposed medially in the side walls of the support leg 50 and clipped in place by respective keeper pins 54.

As will be apparent to those skilled in the art, the jack apparatus of the present invention is intended to be incorporated as original equipment at the time the recreational trailer is manufactured. The mounting housing 18 is received in and welded at its opposite ends to the trailer framework to be integrated directly thereinto. The jack assembly 28 may then be attached thereto with the jack screw 44 threaded through the bore 48 in the trunion 46 and the outboard end extended outwardly through the bore 73 in the inboard bracket 70. The outboard end of the jack link 64 may be attached to the bearing assembly 42 by buttoning the axle tabs 38 into the bores 55 (FIG. 5). The bearing assembly of the outboard bracket 72 is then slid over the outboard extremity of the jack screw 44 and the mounting flange 36 located to the outboard end of the cavity 32 and bolted to the top wall of the housing 18, FIGS. 2 and 3. The roll pins 43 may then be inserted in the drive screw 44 to hold such bearing assembly captive therebetween. A roll pin 65 will also be inserted in a bore at the outboard end of the drive screw 44 for engagement by a drive tool (not shown).

With the jack assemblies 28 in their retracted positions shown in FIG. 2, the respective jack legs 50 are disposed in their elevated positions in covering relation below the jack screw 44 with the side flanges 61 serving to block mud and debris from being thrown directly upwardly onto the screw by the tires. When the driver reaches his or her destination and parks the trailer, he or she may engage a tire wrench or like driver with the outboard ends of the respective jack screws 44 to engage the cross pin driver head 65. Rotation of the respective jack screws will drive the respective trunions 46 in respective an outward directions to drive the lower extremities of the respective support legs downwardly as dictated by the respective jack links 64.

When the respective jack shoes 60 engage the ground, further rotation of the respective screws to drive the respective legs to more upright positions will cause the support legs to rotate counter clockwise around their respective lower ends as viewed in FIG. 3 to apply respective stabilizing forces upwardly through the upper extremities of the jack assemblies directly to the under surface of the respective top walls 36 of the channel housings 18 and directly into the frame of the trailer. This direct application of the stabilizing forces to the trailer frame will serve to maintain the application of forces centered along the longitudinal center lines of the respective housings 18 and avoid rocking of the jack housing as has often been the case for prior art after market stabilizer jack.

It will be appreciated that such stabilizing forces applied through the respective inclined support legs 50 rotating about the respective feet 60 creates a bracing action directed along the respective diagonal vertical planes extending longitudinally through the respective housings 18. Referring to FIG. 3, it will be appreciated that outward forces act to the left on the trunion 46 and consequently to the top end of the jack leg 50 thereby tending to rotate the bottomed end of such leg inwardly or to the right as shown in FIG. 3. This serves to generate a force vector on the foot 60 which acts down and to the right which can be broken down into vertical and horizontal components. The horizontal component is represented by the arrow 67 acting inwardly to the left with reference to the frame (see FIGS. 1 and 3). This force is then counteracted by an equal and opposite force acting upwardly and outwardly from the ground and which will have a horizontal component equal and opposite to the component represented by the vector 67. This inward vector, for each jack assembly acts diagonally inwardly on a line 45° to the longitudinal center of the trailer. It has been found that this feature serves to essentially brace the trailer to such a degree that rocking back and forth of the support wheels is resisted to the point that stability is achieved without blocking such wheels or applying a tire choke thereto.

From the foregoing it will be apparent to those skilled in the art that the stabilizing jack apparatus of the present invention provides a sturdy and economical construction which serves to apply stabilizing forces to a recreational vehicle in an effective and efficient manner. The apparatus of the present invention eliminates the necessity of a separate jack housing normally associated with jacks fitted after assembly of the R.V. providing for relatively sturdy support. By incorporating the present invention at the time of original vehicle manufacture, it becomes protected to orient the respective planes of jack articulation on respective diagonals at the respective four corners of the vehicle such that the stabilizing action of the respective jacks serve to brace the body of the vehicle from rocking back and forth in the longitudinal direction.

It will be apparent from the forgoing that, while particular forms of the invention have been illustrated and described, various modifications can be made without departing from the spirit and scope of the invention. Accordingly, it is not intended that the invention be limited, except as by the appended claims.

What is claimed is:

1. Integrated recreational vehicle stabilizer apparatus to be driven by a manual driver comprising;

a floor support structure including a floor support framework and supported floor, having lateral sides and front and rear ends, said floor support framework forming two pairs of integrated elongated forward and rearward, downwardly opening channel shaped jack housings at said forward and rearward ends and formed with respective top walls having respective downwardly facing bearing surfaces, each said housing projecting from an inboard end to an open outboard end;

support wheels for supporting said weight of said support structure;

two pairs of forward and rearward stabilizer jack assemblies mounted from the respective said jack housings and including respective inboard and outboard mounting brackets mounted to the respective said jack housings at the respective said inboard and outboard ends, jack screws carried on their opposite ends by the respective said mounting brackets and including at their respective outer ends respective drive heads disposed at the respective said open outboard ends to be accessible by said manual driver, trunions formed with respective through threaded bores receiving the respective said jack screws and bearing against the respective said bearing surfaces, elongated upwardly opening channel support legs received in a respective said downwardly opening housing when the respective jack assemblies are in respective retracted positions and carried on their respective one extremities from the respective said trunions and formed on their respective opposite extremities with respective feet, and respective elongated jack links formed with upwardly opening channels configured to, when the respective jack assemblies are in their respective retracted positions, be received in the respective channel leg, said links being pivotally connected between said outboard mounting brackets and the respective intermediate portion of the respective support legs, said jack screws being operative in response to rotation in respective said one direction to draw the respective said trunions in respective outboard directions to lower the respective said legs from respective retracted positions to extended positions to engage the respective said feet with a support surface supporting said recreational vehicle and to, upon continued rotation in the respective said one direction, draw said trunions further outboard causing the respective said trunion to act directly upwardly on the respective said bearing surfaces to resist downward movement of said framework and take part of the weight off said support wheels.

2. Integrated stabilized recreational vehicle apparatus as set forth in claim 1 wherein;
   said framework has a longitudinal center line medially extending for said forward and rearward ends of said framework; and
   said jack mounting housings are located at adjacent corners of said recreational vehicle and extend in respective directions diagonal to the longitudinal center line of said recreational vehicle.

3. An integrated stabilizer jack apparatus to be driven by a manually manipulated driver adapted to access such apparatus from the periphery thereof and comprising:
   a floor support framework formed integrally with two pairs of respective forward and rearwardly disposed elongated channel shaped housings formed with top walls defining respective downwardly facing bearing surfaces and side walls cooperating to define respective downwardly opening jack compartments and terminating in respective outboard open ends disposed in spaced relation along said periphery;
   respective inboard mounting brackets formed with respective through nesting bores;
   respective outboard mounting brackets including respective horizontal mounting flanges and vertical axle flanges formed with respective central bores aligned with the respective said nesting bores and including respective pairs of laterally projecting axle tabs;
   respective elongated jack screw received in respective said compartments and formed with respective inboard extremities projecting through said nesting bores and projecting at the respective outboard extremities through the respective said central bores and formed with respective driver heads disposed adjacent the respective said open ends to be accessed by said driver;
   thrust means on the respective said screws to engage and hold captive the respective said screws;
   respective trunions formed with threaded bores, through which the respective said screws are screwed, and including respective opposite ends and respective peripheral bearing surfaces arranged to bear against the respective said top wall bearing surfaces;
   respective channel shaped jack legs formed with respective upwardly extending side walls defining respective cavities opening upwardly toward the respective said screws, the respective said legs including respective upper extremities configured with said side walls engaging the respective opposite ends of the respective said trunions and further including respective lower extremities including respective ground engaging feet;
   respective pairs of pivot pins connecting respective said upper extremities of said legs to said opposite ends of the respective said trunions;
   respective channel shaped jack links including respective opposed lateral side walls and upper and lower ends, the respective said lateral side walls including at their respective upper extremities respective axle bores pivotally receiving the respective said axle tabs to pivotally attach said jack link to said outboard mounting bracket; and
   respective second pairs of pivot pins pivotally connecting the respective said lower ends of said links intermediately to said legs whereby rotation of the respective said screws in respective one directions will drive respective said trunions and thereby the respective said upper extremities of the respective said legs away from the respective said outboard mounting brackets to pivot the respective said lower ends of the respective said links upwardly to cooperate in raising the respective said lower extremities of the respective said legs, likewise rotation of the respective said screws in the direction opposite the respective said one directions will draw the respective said trunions toward the respective said outboard mounting brackets to drive the respective said lower extremities of the respective said legs downward, pivoting the respective said links against the respective said axle tabs to cause the respective said feet to, when engaged with an underlying ground surface supporting said apparatus, cause the respective said upper ends of the respective said legs to apply force upwardly on the respective said trunions against the respective said top walls.

4. The stabilizer jack apparatus of claim 3 wherein:
   said side walls of the respective said legs are formed with respective outward flanges terminating in edges spaced apart to closely fit within said respective sides of the respective said housing to, when the respective said trunions are driven in said direction opposite the respective said one directions, cause the respective said legs to be disposed in covering relation over the respective bottom sides of the respective said screws.

5. The stabilizer jack apparatus of claim 3 wherein:
   the respective said axle bores are sufficiently oversized with respect to the respective said axle tabs to enable said tabs to be assembled into the respective said axle bores during assembly.

* * * * *